United States Patent
Terdy et al.

(10) Patent No.: US 11,136,062 B2
(45) Date of Patent: Oct. 5, 2021

(54) CONTROL FOR ELECTRIC POWER STEERING

(71) Applicant: TRW Limited, Solihull (GB)

(72) Inventors: Tamas Terdy, Solihull (GB); Charles Mahendhrarajah, Solihull (GB); Maciej Kudanowski, Solihull (GB)

(73) Assignee: TRW Limited, Solihull (GB)

( * ) Notice: Subject to any disclaimer, the term of this patent is extended or adjusted under 35 U.S.C. 154(b) by 788 days.

(21) Appl. No.: 15/747,546

(22) PCT Filed: Jul. 26, 2016

(86) PCT No.: PCT/GB2016/052280
§ 371 (c)(1),
(2) Date: Jan. 25, 2018

(87) PCT Pub. No.: WO2017/017434
PCT Pub. Date: Feb. 2, 2017

(65) Prior Publication Data
US 2018/0208238 A1    Jul. 26, 2018

(30) Foreign Application Priority Data

Jul. 27, 2015  (GB) .................................. 1513200

(51) Int. Cl.
*B62D 5/04*    (2006.01)
(52) U.S. Cl.
CPC ......... *B62D 5/0484* (2013.01); *B62D 5/0463* (2013.01); *B62D 5/0487* (2013.01)
(58) Field of Classification Search
CPC .. B62D 5/0484; B62D 5/0463; B62D 5/0487; B62D 5/04
See application file for complete search history.

(56) References Cited

U.S. PATENT DOCUMENTS 3,600,658 A * 8/1971 Kuniyoshi .............. H02P 6/085
                                                    318/400.27
4,847,742 A * 7/1989 Ohashi .............. H02M 3/33561
                                                    363/21.14
(Continued)

FOREIGN PATENT DOCUMENTS

CN    100497064 C  *  6/2009  ............... B62D 5/04
CN    103895696 A  *  7/2014
(Continued)

OTHER PUBLICATIONS

Patents Act 1977: Search Report under Section 17(5), Application No. GB1513200.4, dated Jan. 26, 2016.
(Continued)

*Primary Examiner* — Behrang Badii
*Assistant Examiner* — Jalal C Coduroglu
(74) *Attorney, Agent, or Firm* — MacMillan, Sobanski & Todd, LLC (57) ABSTRACT

A method of controlling an electric power assisted steering (EPS) apparatus comprises a plurality of inverter bridges each connected to a multi-phase motor configured to provide power assist to steering of a vehicle. After detection of a failure within one of said inverter bridges, the current flow within the faulty inverter bridge is controlled, and one or more of the other inverter bridges is used to provide power assistance. A control system for an electric power assisted steering (EPS) apparatus comprises a plurality of inverter bridges each connected to a multi-phase motor configured to provide power assist to steering of a vehicle, selection means for selectively operating switches in an inverter bridge in which a failure has been detected to control the current flow within the faulty inverter bridge, and control means for controlling one or more of the other inverter bridges to provide power assistance in accordance with the method.

12 Claims, 12 Drawing Sheets

(56) References Cited

U.S. PATENT DOCUMENTS

| | | | | |
|---|---|---|---|---|
| 6,278,677 B1* | 8/2001 | Sako | G11B 17/225 | 720/607 |
| 6,683,435 B1* | 1/2004 | Liang | B60L 3/0023 | 318/400.01 |
| 6,929,090 B2* | 8/2005 | Furumi | B62D 5/04 | 180/446 |
| 6,971,473 B2* | 12/2005 | Furumi | B62D 5/04 | 180/443 |
| 7,014,008 B2* | 3/2006 | Furumi | B62D 5/04 | 180/443 |
| 7,383,110 B2* | 6/2008 | Suzuki | B62D 5/046 | 363/9 |
| 9,621,073 B1* | 4/2017 | Liu | H02M 7/53871 | |
| 2004/0007416 A1* | 1/2004 | Furumi | B62D 5/0409 | 180/443 |
| 2005/0087390 A1* | 4/2005 | Furumi | B62D 5/0421 | 180/446 |
| 2005/0093489 A1* | 5/2005 | Furumi | B62D 5/04 | 318/34 |
| 2006/0001392 A1* | 1/2006 | Ajima | B62D 5/0463 | 318/432 |
| 2006/0009893 A1* | 1/2006 | Suzuki | B62D 5/046 | 701/41 |
| 2010/0036555 A1* | 2/2010 | Hosoda | B60L 3/04 | 701/22 |
| 2010/0079095 A1* | 4/2010 | Shibata | B62D 5/0487 | 318/474 |
| 2010/0085787 A1* | 4/2010 | Kane | B60K 6/445 | 363/123 |
| 2010/0087988 A1* | 4/2010 | Nakamura | B62D 6/04 | 701/41 |
| 2010/0217487 A1* | 8/2010 | Murakami | B62D 5/0463 | 701/42 |
| 2010/0299027 A1* | 11/2010 | Aoki | B62D 5/0463 | 701/42 |
| 2011/0043152 A1* | 2/2011 | Kidokoro | B62D 5/0487 | 318/490 |
| 2011/0074323 A1* | 3/2011 | Mukai | B62D 5/0487 | 318/400.21 |
| 2011/0074333 A1* | 3/2011 | Suzuki | B62D 5/0484 | 318/724 |
| 2011/0156626 A1* | 6/2011 | Mukai | H02P 29/0241 | 318/400.21 |
| 2012/0031697 A1* | 2/2012 | Matsuda | H02K 29/08 | 180/446 |
| 2012/0087167 A1* | 4/2012 | Kuzumaki | H02M 7/5388 | 363/131 |
| 2012/0145472 A1* | 6/2012 | Imamura | B62D 5/046 | 180/446 |
| 2012/0176069 A1* | 7/2012 | Sagami | B62D 5/0487 | 318/400.02 |
| 2012/0232755 A1* | 9/2012 | Birsching | B62D 5/0472 | 701/41 |
| 2013/0063060 A1* | 3/2013 | Dorner | H02P 6/15 | 318/400.14 |
| 2013/0066523 A1* | 3/2013 | Iwamoto | G05B 11/01 | 701/41 |
| 2013/0238193 A1* | 9/2013 | Bolourchi | B62D 5/0466 | 701/42 |
| 2013/0253773 A1* | 9/2013 | Itamoto | B62D 5/0484 | 701/43 |
| 2013/0261894 A1* | 10/2013 | Kojima | B62D 5/0484 | 701/41 |
| 2013/0293171 A1* | 11/2013 | McLean | H02P 25/03 | 318/400.32 |
| 2013/0314014 A1* | 11/2013 | Tremel | H02M 1/32 | 318/400.22 |
| 2013/0320905 A1* | 12/2013 | Uryu | B62D 5/0403 | 318/490 |
| 2014/0032050 A1* | 1/2014 | Kim | B62D 5/0463 | 701/42 |
| 2014/0156144 A1* | 6/2014 | Hoshi | B62D 5/0484 | 701/41 |
| 2014/0188337 A1* | 7/2014 | Pyo | B62D 5/0469 | 701/41 |
| 2014/0246999 A1* | 9/2014 | Kezobo | H02P 25/22 | 318/400.23 |
| 2014/0365077 A1* | 12/2014 | Kariatsumari | B62D 6/002 | 701/41 |
| 2015/0012161 A1* | 1/2015 | Kanekawa | B62D 5/0487 | 701/22 |
| 2015/0145449 A1* | 5/2015 | Mukai | H02M 1/32 | 318/400.22 |
| 2015/0314694 A1* | 11/2015 | Alakula | B60L 53/14 | 320/109 |
| 2016/0142003 A1* | 5/2016 | Scotson | H02P 6/10 | 180/446 |
| 2016/0179737 A1* | 6/2016 | Brouwer | G06F 13/4022 | 710/104 |
| 2018/0208238 A1* | 7/2018 | Terdy | B62D 5/0463 | |
| 2018/0351494 A1* | 12/2018 | Tateda | G01R 31/52 | |
| 2019/0393825 A1* | 12/2019 | Maeshima | B62D 5/0481 | |

FOREIGN PATENT DOCUMENTS

| | | | | |
|---|---|---|---|---|
| DE | 102010037541 A1 * | 3/2011 | | H02P 29/032 |
| EP | 1607304 B1 * | 7/2007 | | B62D 5/04 |
| EP | 2803556 A1 | 11/2014 | | |
| EP | 2819295 A1 | 12/2014 | | |
| JP | 2007295658 A | 11/2007 | | |
| JP | 2013241162 A * | 12/2013 | | |
| JP | 2017029047 A * | 2/2017 | | |
| KR | 20100036555 A * | 4/2010 | | |
| KR | 20100079095 A * | 7/2010 | | |
| KR | 20110043152 A * | 4/2011 | | G06F 1/1626 |
| KR | 20110074323 A * | 6/2011 | | |
| KR | 20110074333 A * | 6/2011 | | G06F 1/1626 |
| KR | 20150012161 A * | 2/2015 | | B62D 5/0484 |
| WO | WO-2008108159 A1 * | 9/2008 | | H01L 24/40 |
| WO | WO-2013111327 A1 * | 8/2013 | | B60L 3/0092 |
| WO | WO-2013140906 A1 * | 9/2013 | | H02M 7/53871 |
| WO | WO-2014113775 A1 * | 7/2014 | | B62D 5/0487 |
| WO | WO-2015022718 A1 * | 2/2015 | | B62D 5/0484 |
| WO | WO-2017017434 A1 * | 2/2017 | | B62D 5/0484 |

OTHER PUBLICATIONS

PCT International Search Report and Written Opinion, Application No. PCT/GB2016/052280, dated Sep. 30, 2016.

* cited by examiner

| Parameters | Value |
|---|---|
| Back EMF voltage peak | 6V |
| Back EMF frequency | 50Hz |
| Battery voltage | 12V |
| Fault condition | 1 TOP SIDE MOSFET shorted, no turn-off possible |

| Parameters | Baseline | Solution 1 | Solution 2 |
|---|---|---|---|
| Healthy MOSFETs condition (TOP side, LOW side MOSFETs all OFF) | OFF | ON | Switching synchronously |
| Conducting MOSFET part | Body diode | MOSFET channel | MOSFET channel |
| Vds across healthy MOSFET when conducting | 830mV | 127mV | 127mV (value on graph is peak value) |
| Id peak through healthy MOSFET | 218A | 267A | 233A |
| Average power dissipation per healthy MOSFET | 42.5W | 17W | 5.9W |
| Current direction through healthy MOSFETs | Negative | Bi-directional | Negative |
| Software load | Normal | Slightly higher | Higher |
| Damping level | Normal | Higher | Normal |
| Steering resistance type (driver feel) | Continuous | Continuous | Discontinuous (periodic) |
| Information needed to switch the top MOSFETs /Source of information | Fault in bridge/ Bridge driver S/C monitoring | Fault in bridge/ Bridge driver S/C monitoring Motor speed/Motor position sensor | Fault in bridge/ Bridge driver S/C monitoring Motor speed/Motor position sensor Current direction for each healthy MOSFET / Motor position sensor or Bridge driver |

CONTROL FOR ELECTRIC POWER STEERING

CROSS-REFERENCE TO RELATED APPLICATIONS

This application is a national stage of International Application No. PCT/GB2016/052280, filed 26 Jul. 2016, the disclosures of which are incorporated herein by reference in entirety, and which claimed priority to Great Britain Patent Application No. 1513200.4, filed 27 Jul. 2015, the disclosures of which are incorporated herein by reference in entirety.

BACKGROUND OF THE INVENTION

The present invention relates to control in a two (or more) lane Electric Power Assisted Steering (EPS) system and, in particular but not exclusively, to managing faults in such an EPS system.

Electric Power Assisted Steering (EPS) systems are well known in the prior art. The power generated by an electric motor is used to generate an assistance torque in the steering column in the same direction as a detected demand torque generated by a driver of the vehicle turning a steering wheel.

Figure 1A:
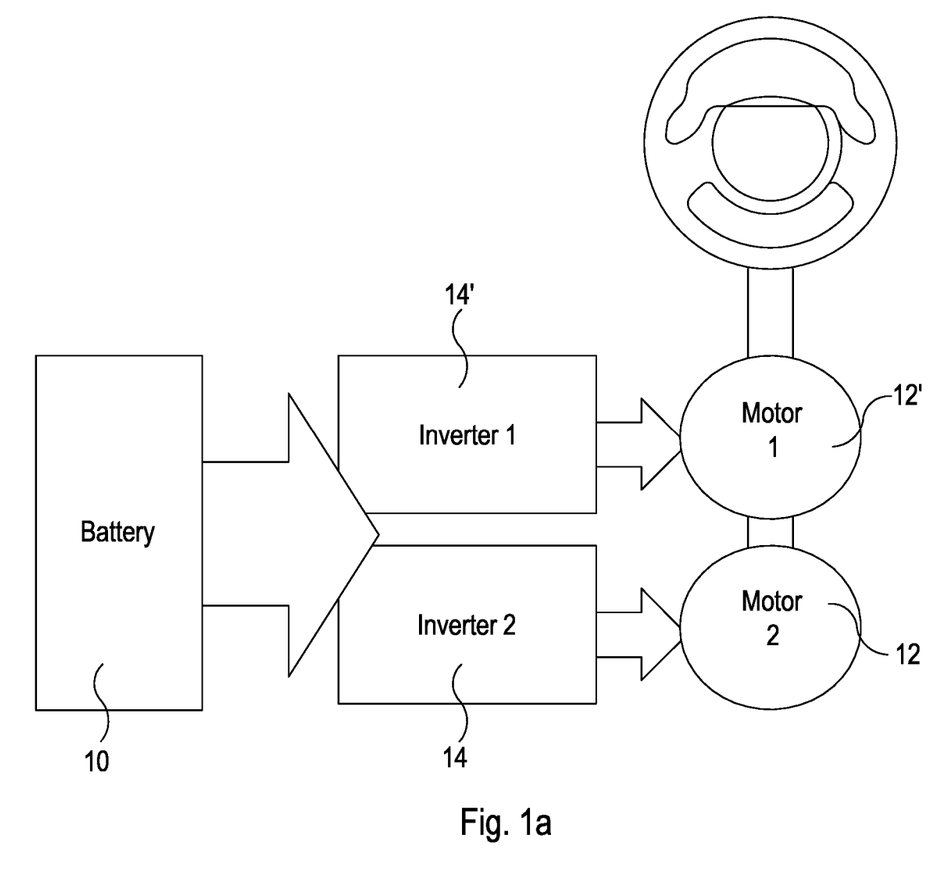
FIGS. 1(a) and 1(b) represent a known dual-bridge control system.

FIG. 1(a) schematically represents power flow in an EPS system having two inverter bridges. A battery 10 powers a dual inverter bridge 14, 14' and two motors 12, 12' that act on the same steering rack. As such, each motor 12, 12' contributes approximately 50% to assist steering. In the case of a fault with one of the inverter bridges 14', as exemplified in FIG. 1(b), the EPS system remains operational since the other inverter bridge 14 can still provide assistance. However, damping currents can still flow in the faulty bridge circuit even if it is disabled. These damping currents can lead to excessive heat generation that can cause further failures. It is of course desirable to maintain steering assistance even in the event of a fault, but such further failures put that in jeopardy.

Known ways of addressing this problem include breaking the connection between the faulty inverter and the motor, which requires a built-in blocking switch. For the majority of times, when there is no fault, these blocking switches serve no useful function but still occupy valuable space, dissipate energy and are expensive. As such, an alternative is desirable. Aspects and embodiments of the present invention have been devised with the foregoing in mind.

BRIEF SUMMARY OF THE INVENTION

According to a first aspect of the present invention there is provided a method of controlling an EPS apparatus comprising a plurality of inverter bridges each connected to a multi-phase motor configured to provide power assist to steering of a vehicle, the method comprising, after detection of a failure within one of said inverter bridges, controlling the current flow within the faulty inverter bridge, and using one or more of said other inverter bridges to provide power assistance.

According to a second aspect of the present invention there is provided a control system for an EPS apparatus comprising a plurality of inverter bridges each connected to a multi-phase motor configured to provide power assist to steering of a vehicle, the system comprising selection means for selectively operating switches in an inverter bridge in which a failure has been detected to control the current flow within the faulty inverter bridge, and control means for controlling one or more of said other inverter bridges to provide power assistance in accordance with the method recited in the preceding paragraph.

According to a third aspect of the present invention there is provided an EPS system comprising a DC voltage source, a motor having a plurality of phases, and a control system according to the preceding paragraph.

Various features of aspects and/or embodiments of the invention are discussed below.

The fault/short circuit may have already been detected or may form part of aspects or embodiments of the invention.

Each of the inverter bridges may comprise two or more switches connected to each phase of the motor. Following an earlier detection of a failure of one of the switches in one of the inverter bridges, in an embodiment the switches in that inverter bridge may be operated or selectively operated to control the current therethrough and/or voltage thereacross.

Each inverter bridge may comprise a plurality of groups of switches each comprising one or more switches connected to each of the phases. After detection of a failure of a switch in a first/other group, the other switches in the first/other group may be selectively operated, but not those in the other/first group. I.e. just the switches within the inverter containing the faulty switch are selectively controlled in this way.

In an embodiment, selectively operating the other switches in the first/other group comprises turning the other switches on permanently.

Alternatively, selectively operating the other switches in the first/other group may comprise turning the other switches on and off. The switching may be in accordance with one or more predetermined criteria. These criteria may comprise one or more of motor speed, motor position, current direction within one of the switches, current or voltage on the motor phases.

Alternatively, the method may comprise selectively operating the switches according to either of the above two methods dependent upon other criteria. In an embodiment, the method may comprise determining if the speed of the motor is less than a predetermined threshold and, if the motor speed is less than the threshold, turning on the other switches in the first/other group and, if the motor speed exceeds the threshold, selectively turning the other switches in the first other group on and off. Additionally or alternatively, the method may comprise determining if a temperature within an inverter bridge circuit is less than a predetermined threshold and, if the temperature is less than the threshold, turning on the other switches in the first/other group and, if the temperature exceeds the threshold, selectively turning the other switches in said first/other group on and off.

In an embodiment selectively turning the other switches in the first/second group on and off is dependent upon one or more of motor speed, motor position, current direction within one of the switches, current or voltage on the motor phases.

Selectively turning the other switches in said first/other group on and off may comprise turning one of the other switches on if the drain-source voltage across that switch is negative or below a preset value, and turning one of the other switches off if the drain-source voltage across that switch is not negative or below said preset value.

The switches may be MOSFETs.

Aspects and embodiments of the invention advantageously provide a control strategy for managing a fault condition such as a shorted MOSFET in an inverter bridge where the fault originated, but still fully operating the other or another inverter bridge and minimising adverse effects thereto. In an embodiment, the invention provides for switching healthy MOSFETs in a faulty bridge to reduce conduction losses to allow extended operation in the reversionary mode and to reduce the likelihood of a secondary failure. This is achieved by directing damping currents through the MOSFET channel rather than through the body diode which advantageously reduces power dissipation in the device significantly. This advantageously enables steering assist to be continually provided whilst avoiding excessive losses in the system.

Other advantages of this invention will become apparent to those skilled in the art from the following detailed description of the preferred embodiments, when read in light of the accompanying drawings.

DETAILED DESCRIPTION OF THE INVENTION

Figure 1B:
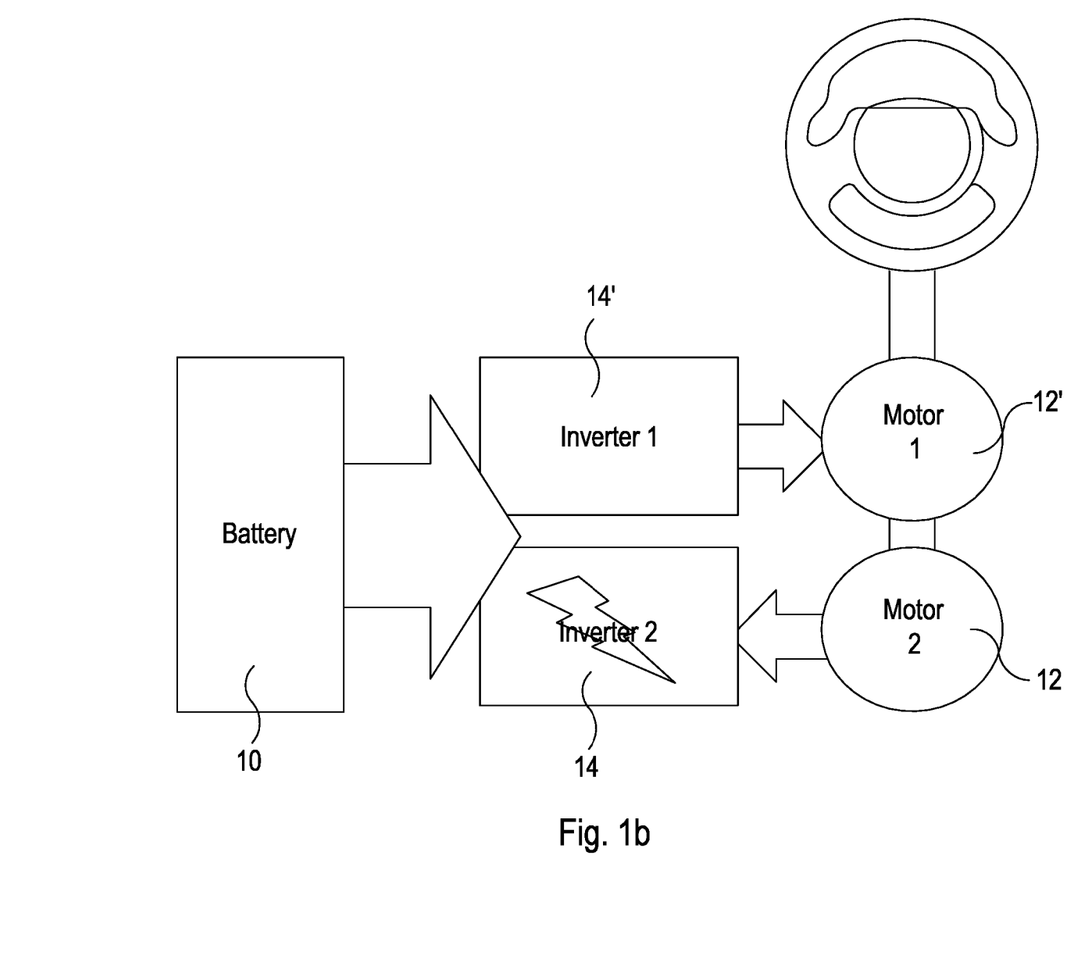

FIGS. 1(a) and (b), although representing a known dual-bridge control system, are utilised in aspects and embodiments of the invention, and so the reference numbers used thereon are also used in connection with discussing the aspects and embodiments of the present invention which are implemented in connection therewith. It is to be noted that the two motors 12, 12' may be physically located in one housing or separately but, in either case, they act on the same steering rack and, in normal operation, each contribute approximately 50% of the steering power. The motors 12, 12' may conveniently be brushless 3-phase AC permanent magnet synchronous (PMSM) motors.

Figure 2A:
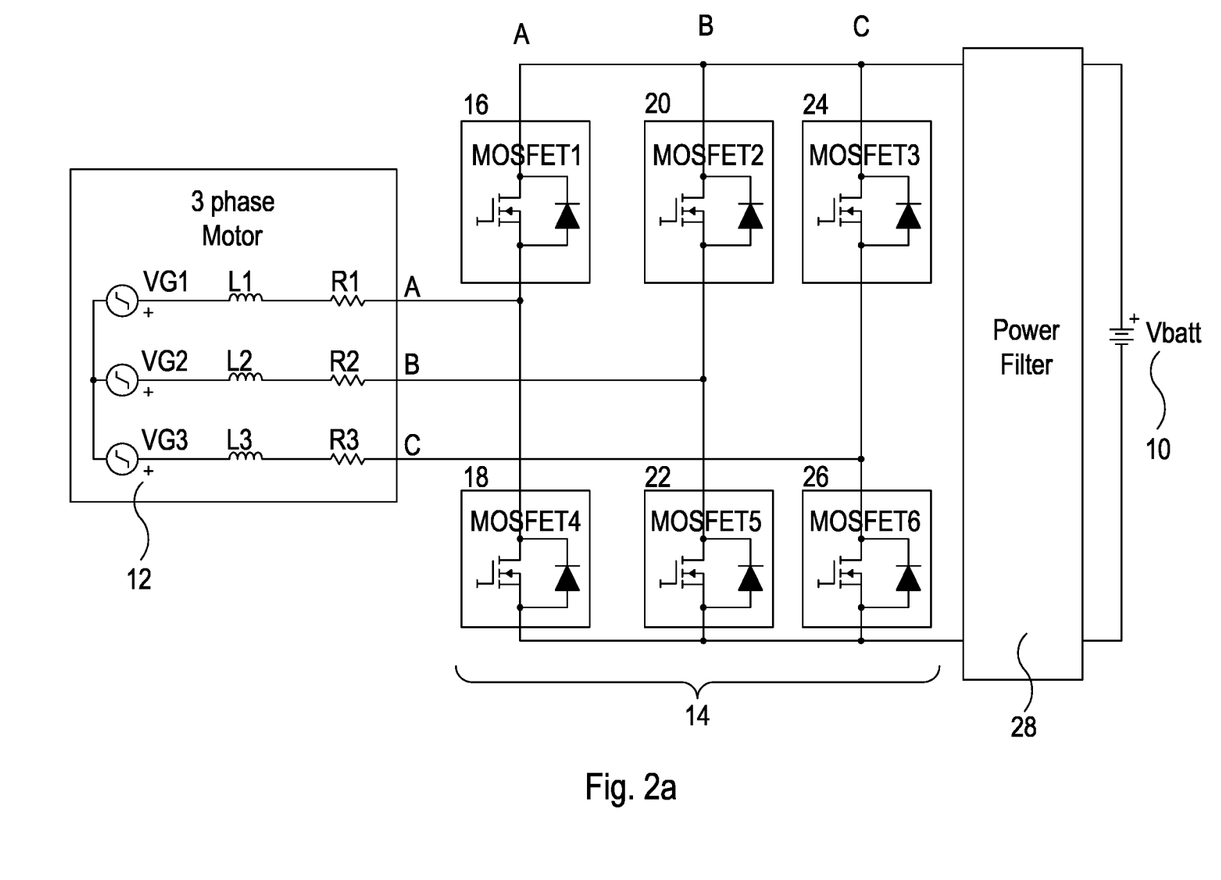
FIGS. 2(a) and (b) show a simplified schematic of one side of a dual-bridge system before and during a fault condition.

FIG. 2(a) shows one half of a dual bridge inverter 14 in more detail than in FIG. 1(a) (which shows both halves). A DC voltage is applied by a battery 10 between a supply rail and a ground line and is connected to a three-phase motor 12 via an inverter 14. The inverter 14 comprises three parallel arms (A, B, C), each of which has a pair of MOSFETs connected in series between a supply rail and a ground line. The motor phases A, B, C branch off from between a respective pair of MOSFETs. As such, MOSFETs 16, 18 are connected to a first phase A of the motor 12, MOSFETs 20, 22 are connected to a second phase B of the motor 12, and MOSFETs 24, 26 are connected to a third phase C of the motor 12. The pairs of MOSFETs (arms A, B, C) are connected in parallel to each other and to the battery 10. A power filter 28 may be provided between the battery 10 and the MOSFETs 16, 18, 20, 22, 24, 26.

The MOSFETS are also arranged in two groups with MOSFETS 16, 20, 24 on the "high" side of the inverter 14 and MOSFETS 18, 22, 26 on the "low" side of the inverter 14. The terms "high" and "low" are labels for ease of reference only. Each MOSFET 16, 18, 20, 22, 24, 26 comprises a body diode and a transistor channel. The gate of each MOSFET 16, 18, 20, 22, 24, 26 is connected to a control block configured for providing a control signal to each MOSFET e.g. to switch it on or off. Gate connections of the MOSFETs and control blocks are not shown for simplicity.

In normal operation, the MOSFETs 16, 18, 20, 22, 24, 26 are turned on and off in a controlled manner by a drive stage controller to control the potential difference applied across each of the motor windings and hence also the current flowing through the windings. This in turn controls the strength and orientation of the magnetic field produced by the windings, and hence the torque and speed of the motor. This applies for both bridges 14, 14' in normal operation, i.e. all MOSFETs of both bridges 14, 14' are turned off and on in a controlled manner during normal operation.

Figure 2B:
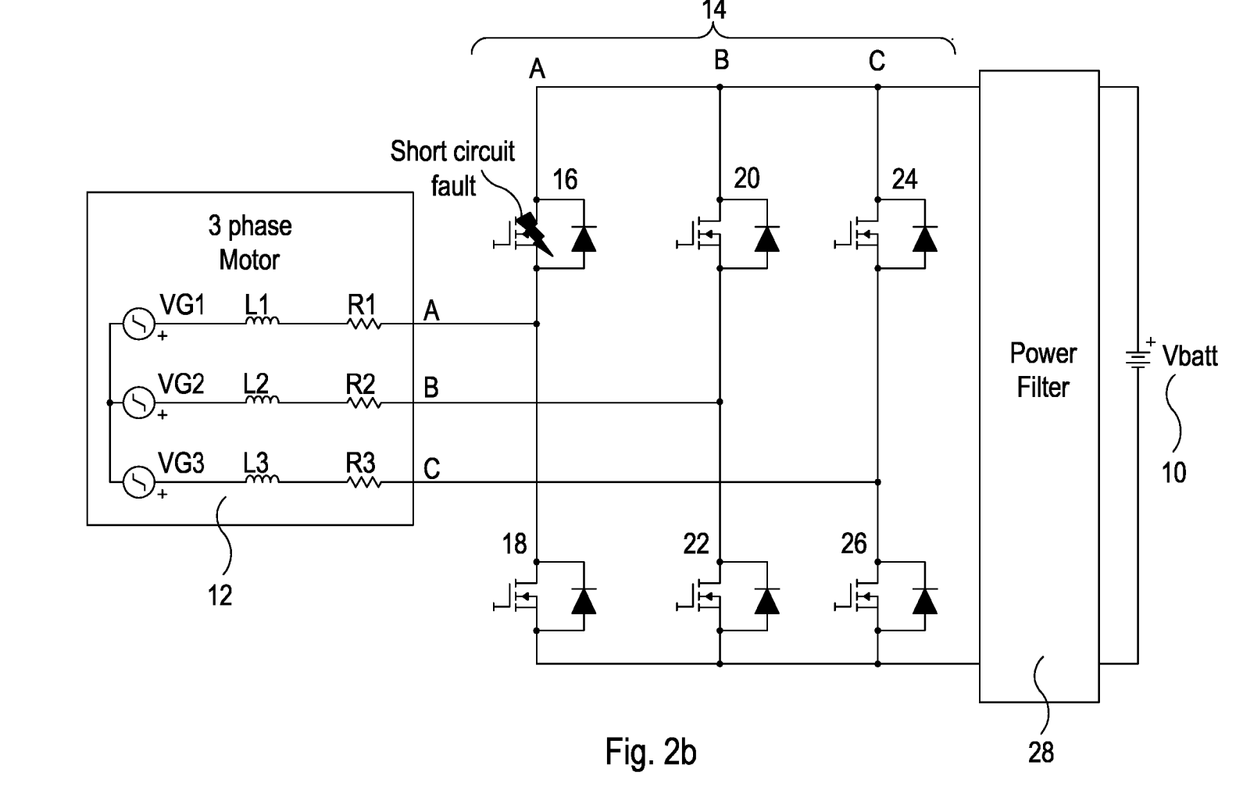

FIG. 2(b) represents the case where one of the MOSFETs 16 of bridge 14 can't be turned-off. (A fault could develop on any or all of the MOSFETs—MOSFET 16 is used as an example only.) The reason for that can be that it has failed in short-circuit failure mode, or a fault in its control circuit which provides the gate signal. Bridge 14' continues to operate normally, as described above. Because there is no way to isolate the motor 12 from the inverter bridge 14 in this architecture, regeneration voltage of the motor as a result of the motor 12 still rotating continues to drive current through the inverter 14 (depending on the speed and position of the motor 12). This regeneration current, which can be excessive and uncontrolled, flows through the now uncontrollable failed MOSFET 16 and the body diodes of the undamaged MOSFETs 20, 24 in the other phases. The current is a result of half-wave rectification of the generated voltage of the motor 12 (back EMF). (MOSFETs 18, 22, 26 would not be conducting in this half wave rectification scenario, and should be turned off constantly.)

As such, although still providing steering assist to the driver, the working bridge (e.g. 14' of FIG. 1) has to overcome the damping effects of the faulty inverter 14. In the exemplary embodiment, with 40V MOSFETs and 100A phase currents, the body diodes have a higher forward voltage drop at a certain current than the MOSFET channel which might lead to excess heat generation thus leading to further failures. If the first fault leads to the failure of a MOSFET in another phase of the same bridge 14, e.g. MOSFET 20, the circulating current is no longer half-wave rectified but full AC. Full AC current increases the damping effect and is thus undesirable. Furthermore, excessive heat generation caused by the additional current flowing through the components might de-solder parts leading to free moving objects inside the inverter 14 with the possibility of causing additional failures. Thus, with reference again to FIG. 1(b), failure of one inverter 14 can interfere with operation of the other 14' such that the "healthy" inverter 14' can no longer provide the full 50% power it is supposed to, exacerbating the system losses.

Figure 3:
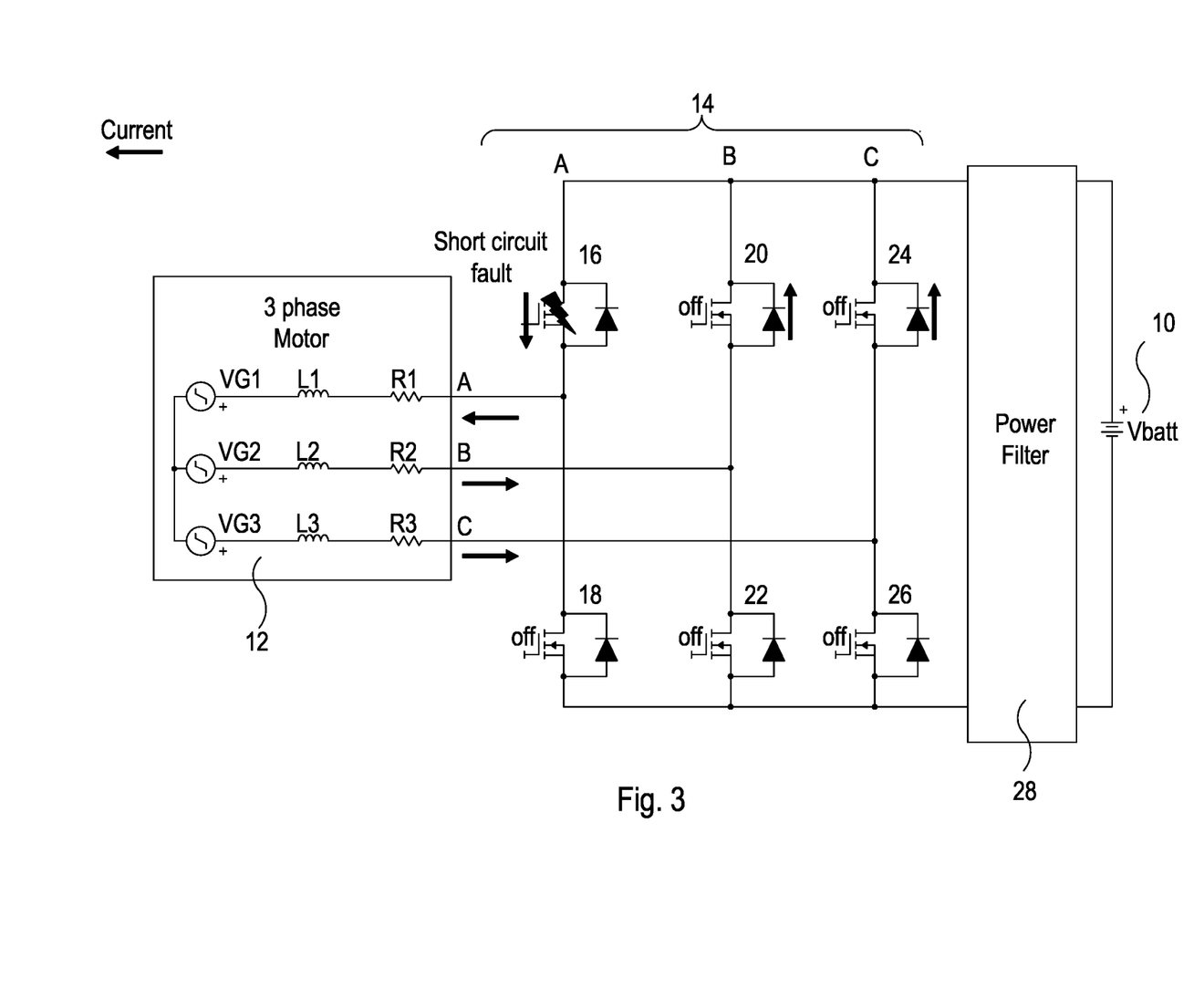
FIG. 3 schematically illustrates current flow within the system of FIG. 2 with all MOSFETs off.

In FIG. 3, MOSFET 16 has a short circuit and is not operational and all other MOSFETs 18, 20, 22, 24, 26 are turned off. However, depending on the speed and position of the motor 12, regeneration voltage of the motor windings drives current through the inverter 14, as shown by the arrows in FIG. 3, and as discussed above. As such, simply turning off the inverter bridge 14 still leads to high power dissipation with the current (which is half-wave rectified) flowing through the circuit as shown by the arrows in FIG. 3. i.e. even taking action to turn the inverter 14 off, as opposed to just leaving it in a normal operational state, is undesirable, as is further exemplified in FIG. 4.

Figure 4:
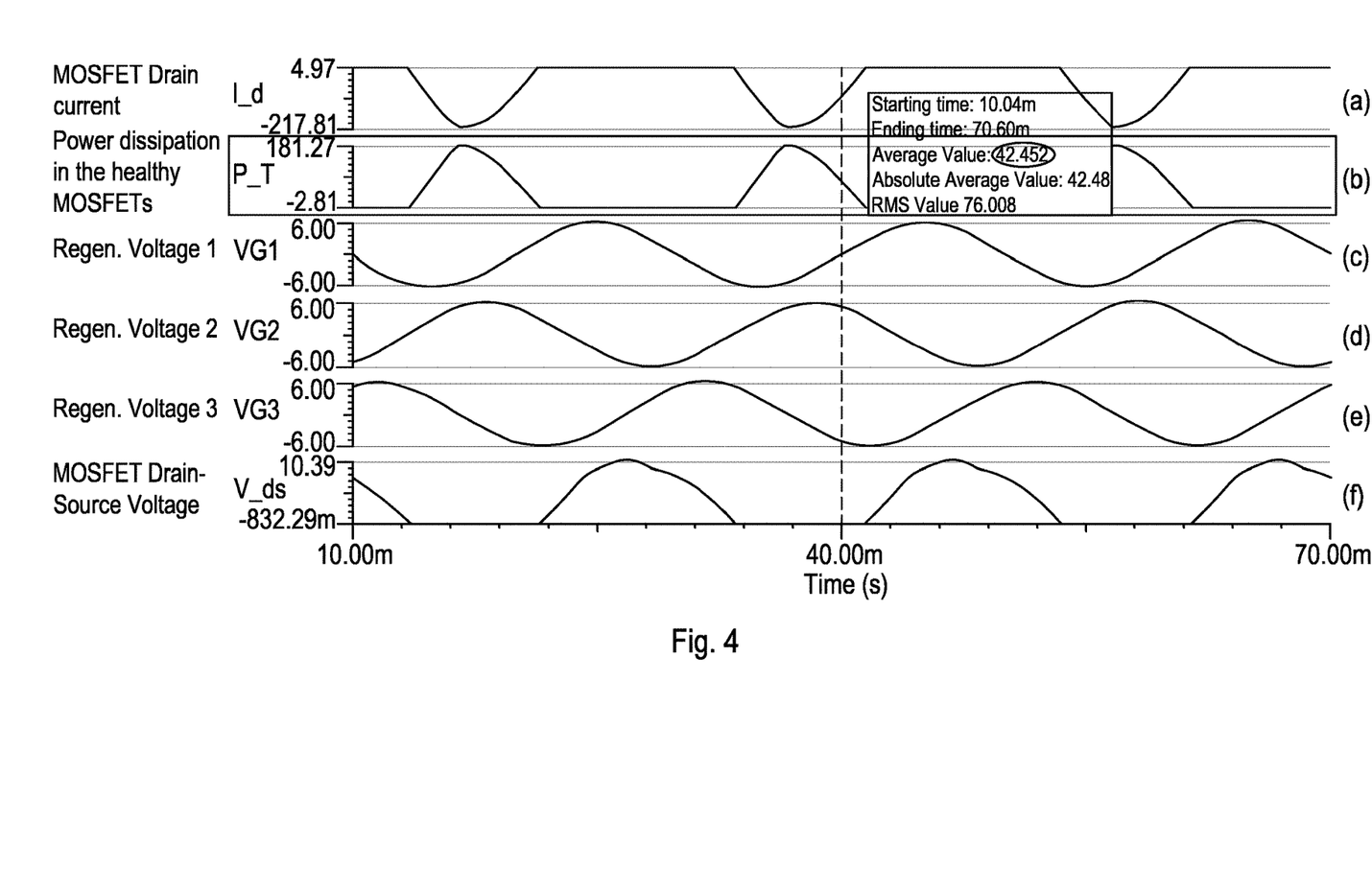
FIG. 4 shows simulation results obtained using the method of FIG. 3.

FIG. 4 shows results of a simulation carried out with a back EMF voltage frequency of 50 Hz, back EMF voltage peak of 6V, link voltage of 12V in a situation where MOSFET 16 cannot be turned off. Graphs (a) and (b) respectively show the MOSFET 20 drain current ($I_d$) and power dissipation in the healthy MOSFETs against time. The plots show a large negative current and high average power dissipation. Plots (c) to (e) show the regeneration voltage on each of the three phases. Plot (f) shows the MOSFET 20 Drain-Source voltage, showing large voltage drops. A voltage drop in the negative direction means the body diode is conducting. Here, the voltage drop, about 0.8V, is higher (in absolute value) than the voltage drop of the MOSFET channel. Because of that, power dissipation on plot (b) only occurs when Vds voltage is negative. High positive direction voltage drop (10.39V peak in this example) shows when the MOSFET 20 is blocking the positive (drain to source) direction current.

Figure 5:
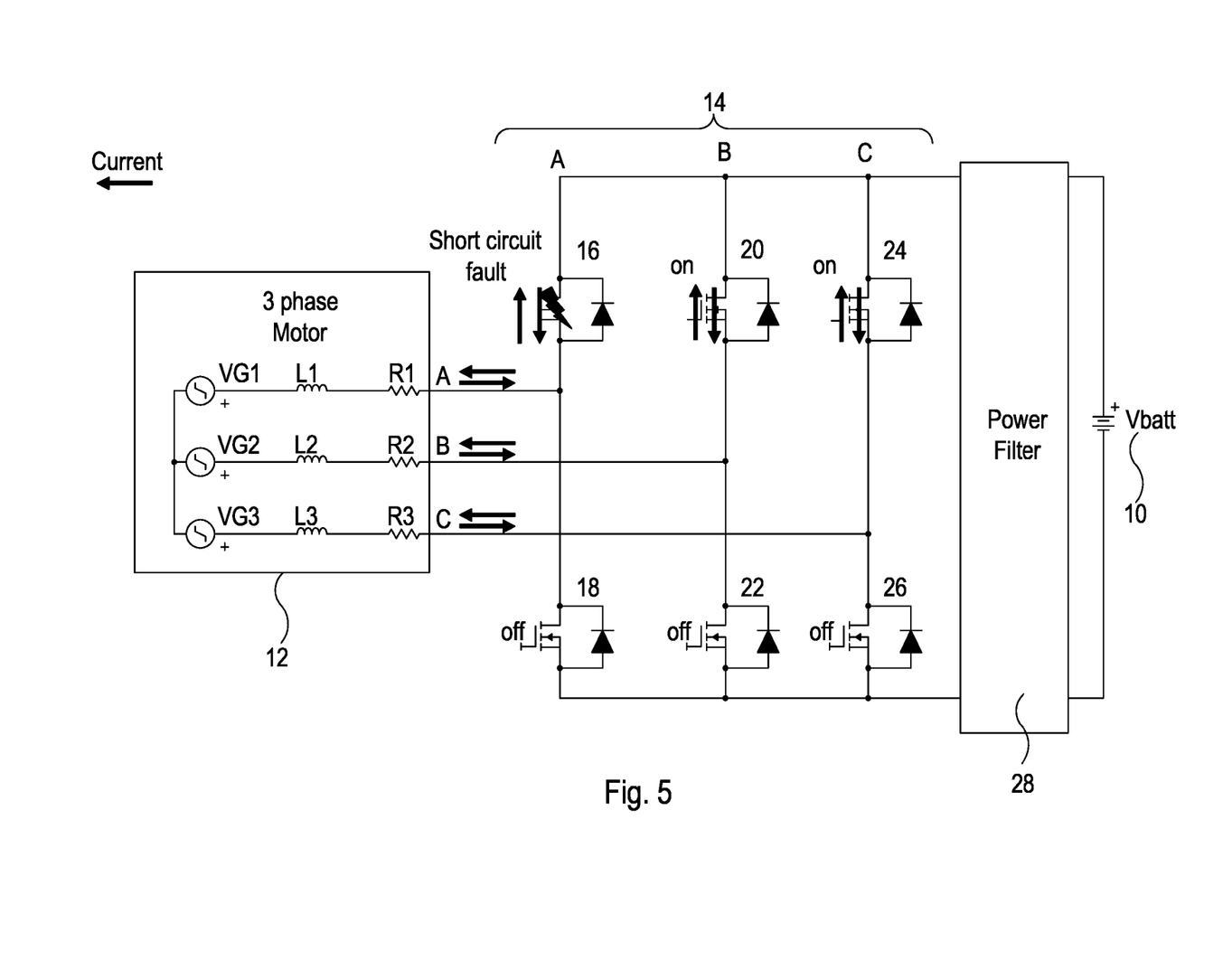
FIG. 5 schematically illustrates a control method in accordance with an embodiment of the invention.

FIG. 5 shows a first option for managing losses in the circuit 14 in the event of a MOSFET fault. Here, again, by way of example, MOSFET 16 is uncontrollably turned-on/ short circuited. However, here the other two high side MOSFETs 20, 24 are switched on and controlled to stay on (and MOSFET 16 could be turned on as well). I.e. all "healthy" MOSFETs within the high/low group are turned on. Circulating currents are still present and current can pass bi-directionally through each of the MOSFETs 16, 20, 14, through the transistor part of the undamaged MOSFETs 20, 24 and the uncontrollable (short circuit), failed MOSFET 16. Turning a MOSFET on enables the current to pass bidirectionally through it.

Figure 6:
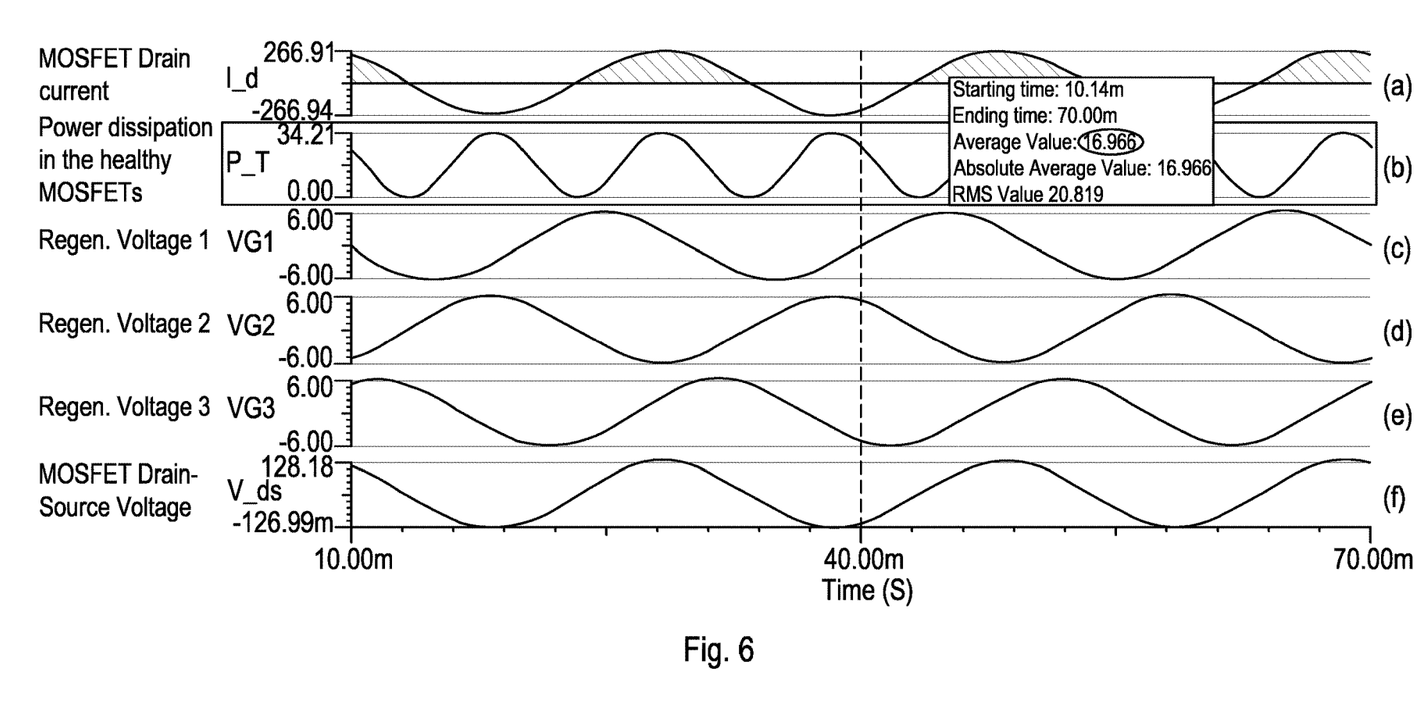
FIG. 6 shows simulation results obtained using the method of FIG. 5.

FIG. 6 shows simulation results for the control method of FIG. 5, under the same conditions as for the simulation results of FIG. 4. Switching MOSFETs 20, 24 permanently on has, however, had the result that the average power dissipation (plot (b)) and MOSFET Drain-Source voltage (plot (f)) are significantly lower. The solution of FIG. 5, switching the two healthy MOSFETs to be on permanently, thus provides a benefit over the "baseline" situation of FIG. 3 where the MOSFETs are switched off. Plot (a) of FIG. 6 shows the MOSFET drain current $I_d$, which has increased a little compared with FIG. 4(a). It is therefore desirable to also look for a way to reduce the current and, preferably, minimise the positive current i.e. that shaded above the central line.

Figure 7:
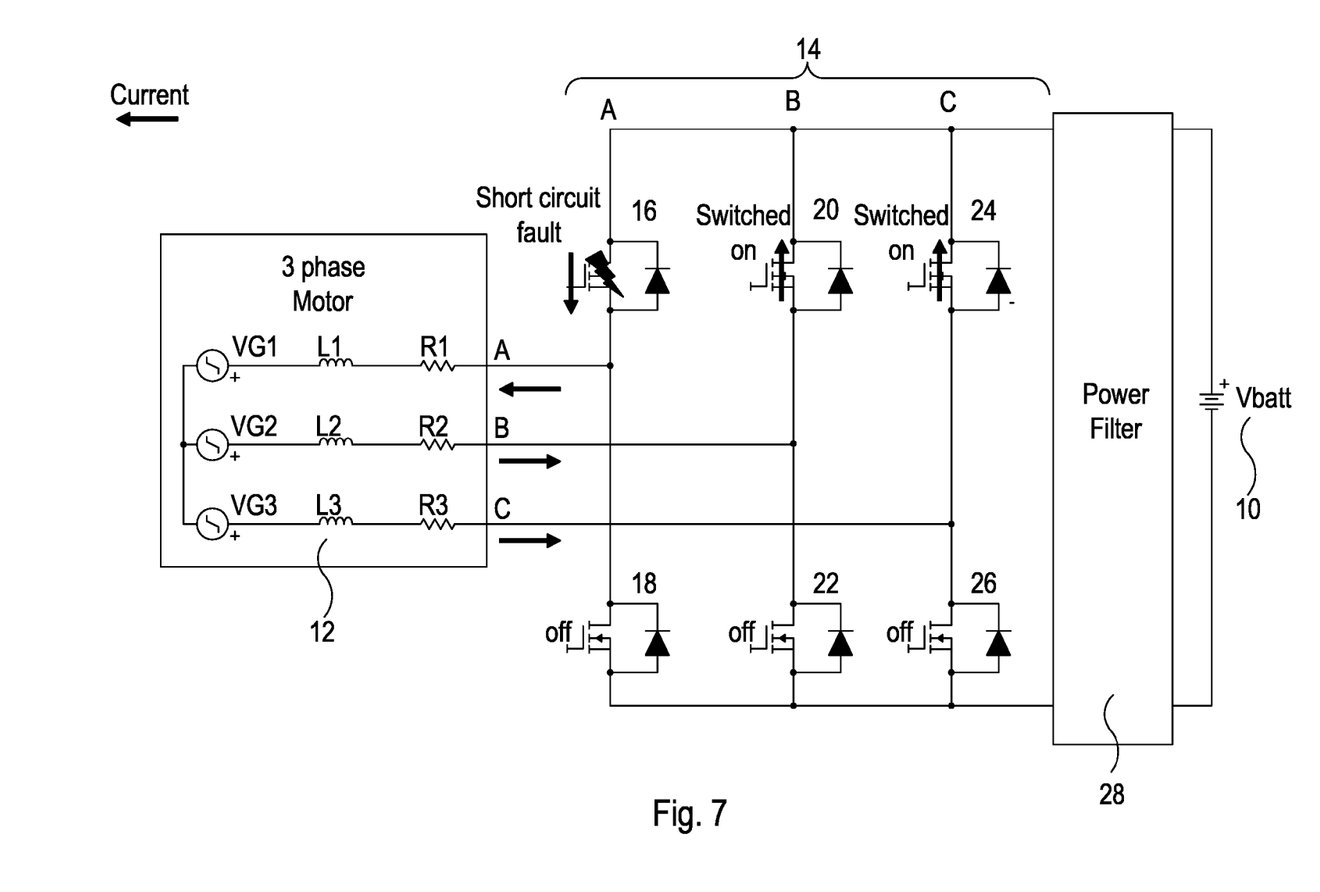
FIG. 7 illustrates a control method in accordance with another embodiment of the invention.

FIG. 7 shows a second option for managing losses in the circuit 14 in the event of a MOSFET fault. Here, again, MOSFET 16 is short circuited. However, the other two high side MOSFETs 20, 24 are now selectively switched to be on at certain times only. Circulating currents are still present, as depicted by the arrows (these showing the current flow when the MOSFETs 20, 24 are turned on). The current, which is half-wave rectified, can pass through each of the MOSFETs 16, 20, 24, through the transistor part of the undamaged MOSFETs 20, 24 and the uncontrollable (short circuit) failed MOSFET 16 (since when the MOSFETs are conducting, they have a lower voltage drop than the diodes). The principle behind this control method is to switch the MOS-FET 20, 24 on when its body diode is about to conduct and thus use the channel instead of the diode. The current will behave directionally in the same way as if the diode was conducting.

Figure 8:
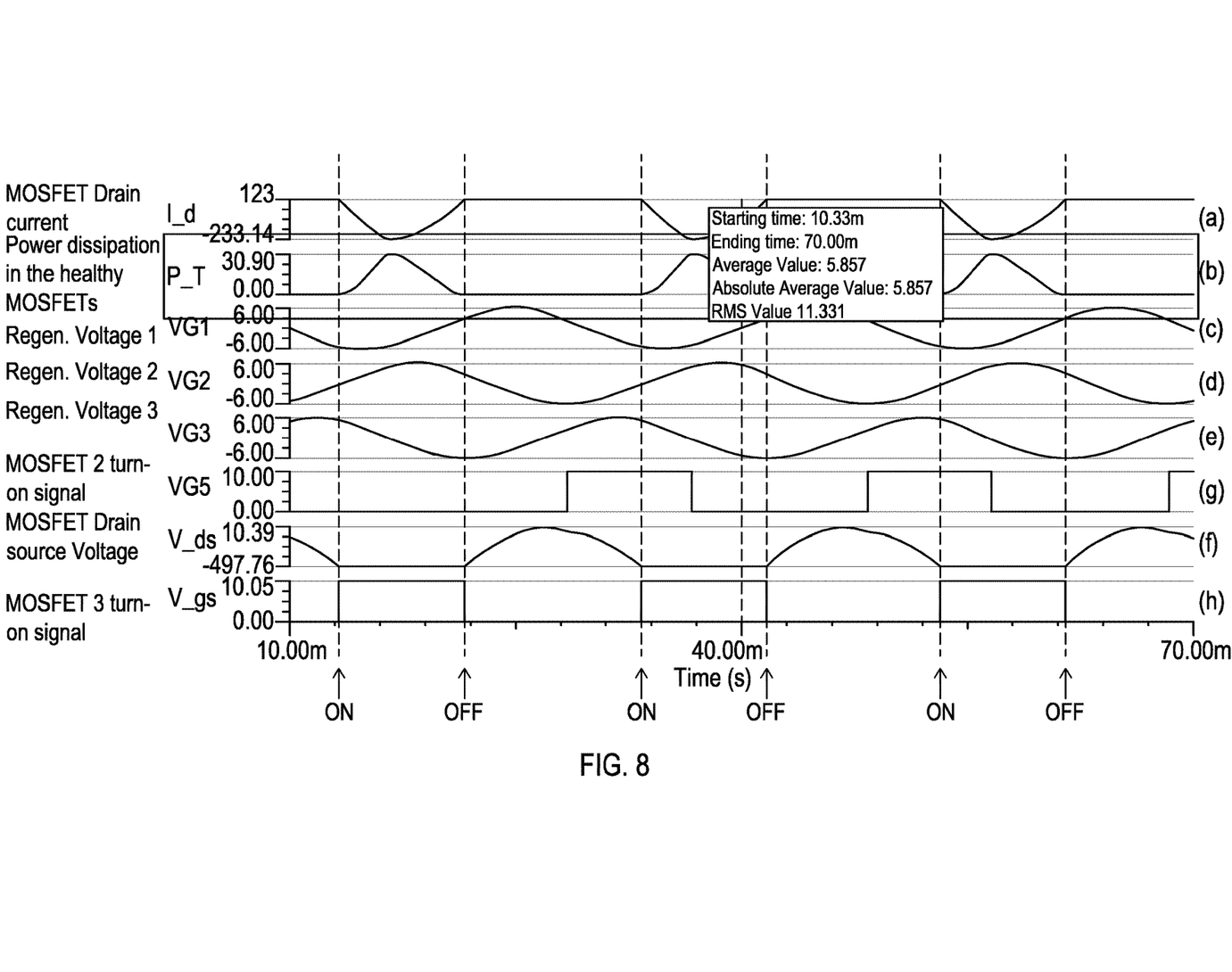
FIG. 8 shows simulation results obtained using the method of FIG. 7.

FIG. 8 shows simulation results for the control method of FIG. 7, under the same conditions as for the simulation results of FIGS. 4 and 6. Switching MOSFETs 20, 24 on and off, however, beneficially results in the drain current $I_d$ (plot (a)), the average power dissipation (plot (b)) and MOSFET Drain-Source voltage (plot (f)) all being significantly further reduced. As compared to FIG. 6(a), it can be seen that here practically all of the positive current (shaded part of FIG. 6(a)) has been eliminated.

The two healthy MOSFETs 20, 24 are signalled to be turned on periodically as shown in plots (g) and (h) of FIG. 8. When to switch the healthy MOSFETs 20, 24 is determined dependent upon, in addition to detecting a fault in the bridge, one or more of the motor speed, motor position or current direction for each healthy MOSFET (i.e. whether the current is positive or negative).

Figure 9:
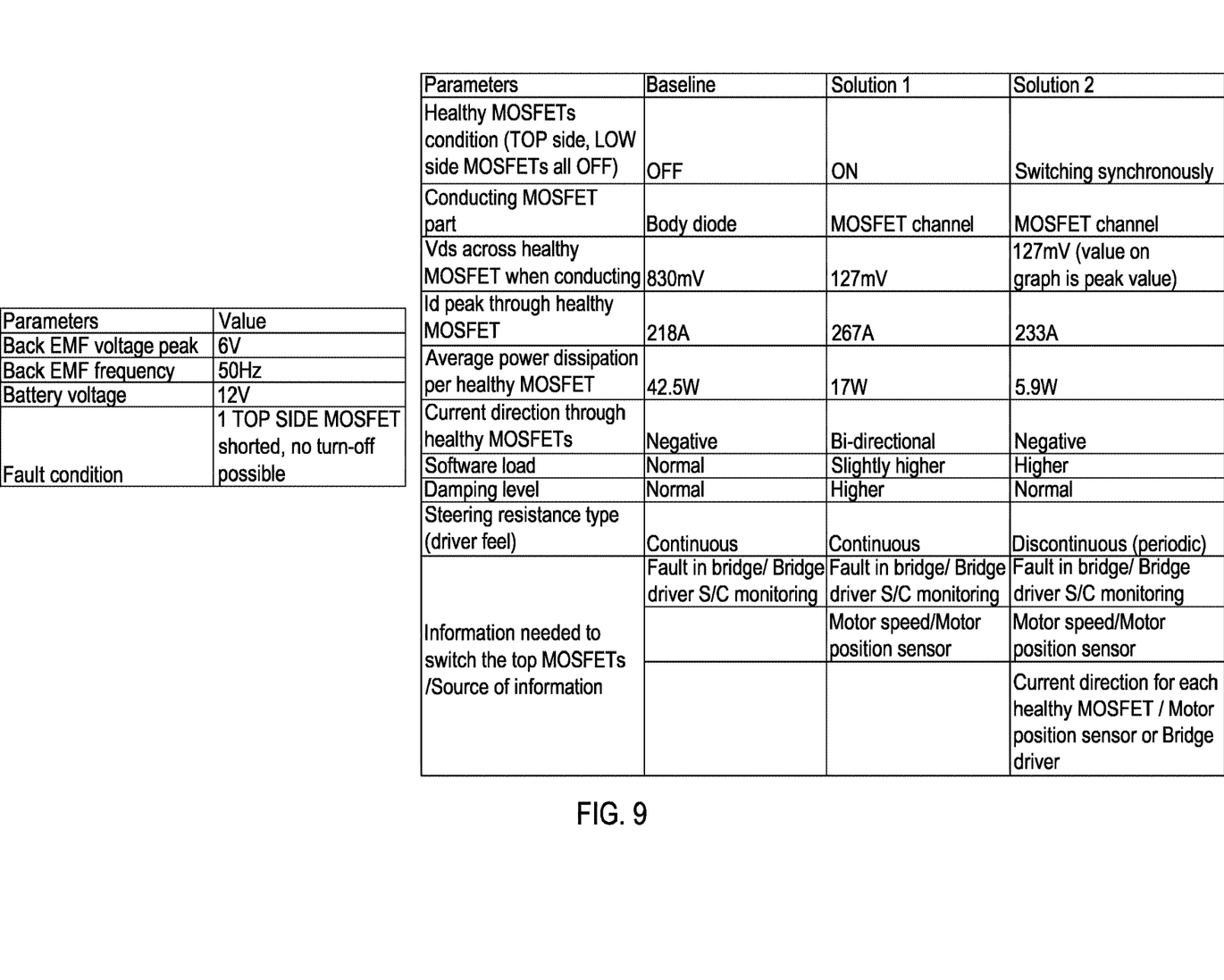
FIG. 9 compares features of control methods according to different embodiments of the invention.

FIG. 9 summarises and compares the "baseline" results (FIGS. 3 and 4), the results from "option 1" (FIGS. 5 and 6) and those from "option 2" (FIGS. 7 and 8).

Figure 10:
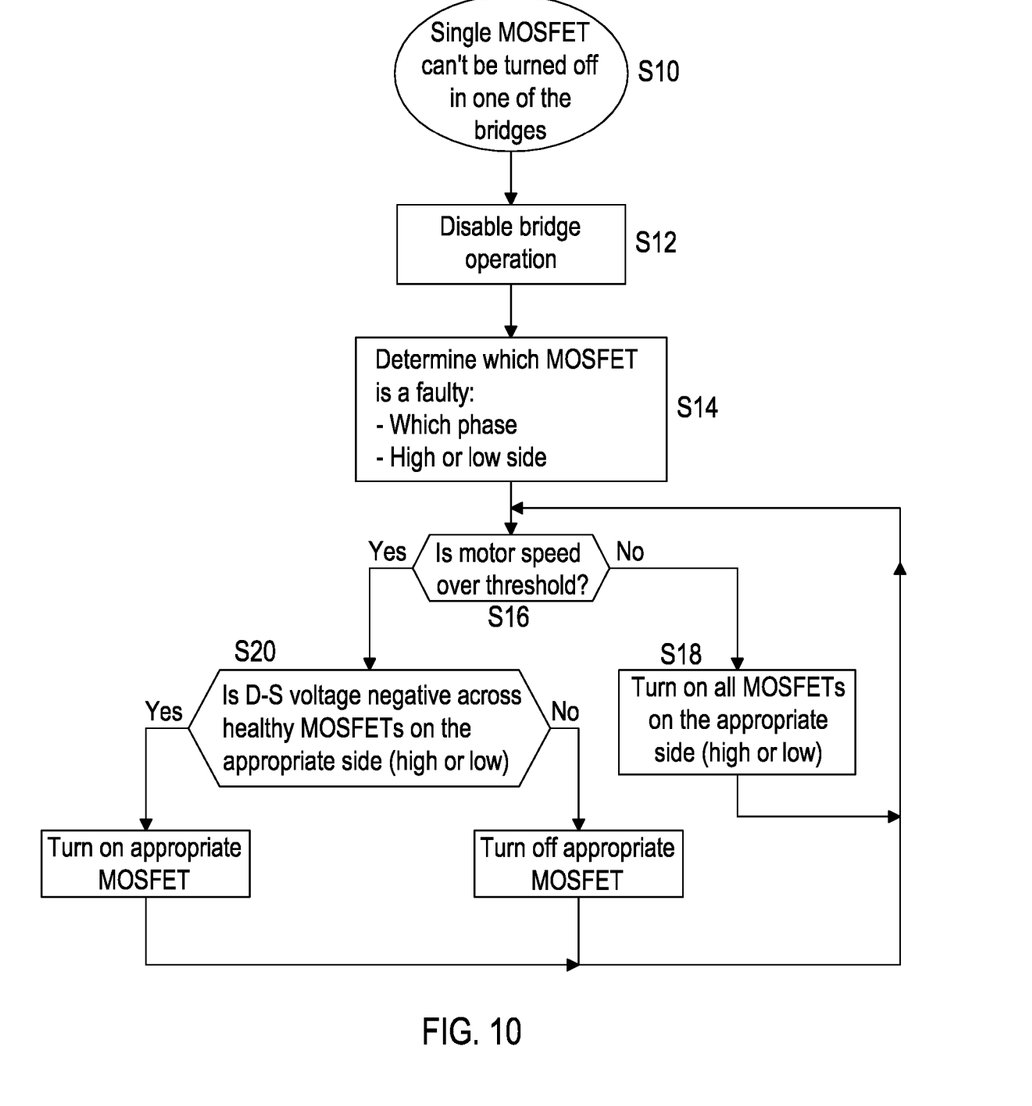
FIG. 10 is a flow chart of a control method in accordance with an embodiment of the invention.

A method of carrying out an embodiment of the invention is summarised in FIG. 10. In step S10 a determination or detection is made that a MOSFET cannot be turned off in one of the bridges 14, 14'. In step S12, normal operation of the faulty bridge (14 or 14') is disabled. In step S14, a determination is then made as to which MOSFET is faulty, including identifying with which phase the faulty MOSFET is associated and whether the faulty MOSFET is on the high or low side. Determining whether a MOSFET is faulty can be achieved using standard techniques, e.g. by monitoring the MOSFET voltage V_DS or current. If a fault is detected, further offline checks can be performed to determine the actual nature of the fault, again using conventional techniques.

The method then determines, in step S16, whether or not the speed of the motor 12 exceeds a particular threshold. The actual threshold will vary depending on the power dissipation in the FETs, temperature, damping level and the desirable steering feel of the driver and may be tunable in each instance. If not, all MOSFETs on the appropriate side (high or low) that includes the faulty MOSFET are turned on in step S18. E.g. assuming again MOSFET 16 is faulty, if the motor speed is lower than the preset threshold, MOSFETs 20, 24 are turned on. This situation corresponds to FIGS. 5 and 6.

If, on the other hand, the motor speed is higher than the threshold then the healthy MOSFETS on the appropriate side (e.g. MOSFETs 20, 24 if MOSFET 16 is faulty) are selectively turned on. If the DS voltage of the MOSFET 20 or 24 is negative, the corresponding MOSFET must be turned on. This can be detected either by measuring phase currents and/or motor position. The MOSFET 20 or 24 can conduct from when the body diode is forward biased (V_DS<0) and will conduct the positive current (going from source to drain of the MOSFET). Since the motor will generate a sinewave, the switching can be synchronised. The regeneration voltage determines when the diode is forward biased. In the example shown, the Drain-Source voltage across the healthy MOSFETs on the appropriate side (MOS-FETs 20, 24 if MOSFET 16 is faulty) is monitored and, if it is negative (step S20) the appropriate MOSFET is turned on (step 22), otherwise it is turned off (step 24).

It can therefore be seen, based on the simulation results of FIGS. 4, 6 and 8, that the best method—in terms of reducing the power dissipation—is to switch the remaining healthy MOSFETs on the same side as the faulty one (high or low) on or off, depending on the MOSFET drain current direction. The DS voltage indirectly gives the current direction, which triggers the switching. I.e. when the DS voltage is negative the MOSFET(s) can be on, but when the DS voltage becomes positive the corresponding healthy MOSFETs is switched off. This is shown by the "on" and "off" switching shown in FIG. 8. Ideally the D-S direction current through the MOSFETs should be blocked to minimize losses, and damping. The S-D current should be carried by the MOSFET rather than the body diode. NB. In FIG. 8(*f*) the DS voltage drops to nearly 0V in steady state, although this is showing as −498.76 mV peak on the scale. This is simply due to the simulation conditions.

To implement this solution may necessitate a more complicated control algorithm and processing time (e.g. as exemplified in FIG. 10) than the solution of option 1. In addition, due to the MOSFET switching strategy of option 2, the half-wave rectified motor damping current may possibly result in increased motor torque ripple.

Another solution, therefore, "option 3" is to utilise both option 1 and option 2 at different times, based on motor speed. Back EMF is low at low motor speed, therefore the circulating damping current is lower as well. This enables the MOSFETs to be turned on full-time without the risk of them overheating (option 1). At a certain speed (and therefore current) threshold, the electronic control unit (ECU) can switch to the more complicated method which lowers power dissipation (option 2).

In the event of a faulty MOSFET, therefore, a procedure is established for switching the MOSFETs of the high/low side that contains the faulty MOSFET, and that switching controls or manages the circulating currents within the inverter bridge 14, whilst power is solely provided by the other inverter bridge 14'. This ensures that the power output of the healthy inverter 14' is not adversely affected by the faulty one.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of controlling an electric power assisted steering apparatus comprising a plurality of inverter bridges each connected to a multi-phase motor configured to provide power assist to steering of a vehicle, wherein each of the inverter bridges comprises two groups of switches, a first group comprising a switch connected to each respective phase of the motor on a first potential side of the inverter and a second group comprising a switch connected to each respective phase of the motor on a second potential side of the inverter, the method comprising, after detection of a failure of a switch in the first group of switches within one of the inverter bridges, controlling the current flow within the faulty inverter bridge by selectively operating the other switches in the first group of switches but not those switches in the second group of switches, and using one or more of the other inverter bridges to provide power assistance, wherein selectively operating the other switches in the first group comprises turning the other switches on and off in accordance with one or more predetermined criteria.

2. The method of claim 1, wherein the criteria comprise one or more of motor speed, motor position, current direction within one of the switches, current or voltage on the motor phases.

3. The method of claim 1, further comprising determining if the speed of the motor is less than a predetermined threshold and, if the motor speed is less than the threshold, turning on the other switches in the first group and, if the motor speed exceeds the threshold, selectively turning the other switches in the first group on and off.

4. The method of claim 1, further comprising determining if a temperature within an inverter bridge circuit is less than a predetermined threshold and, if the temperature is less than the threshold, turning on the other switches in the first group and, if the temperature exceeds the threshold, selectively turning the other switches in the first group on and off.

5. The method of claim 3, wherein selectively turning the other switches in the first group on and off is dependent upon one or more of motor speed, motor position, current direction within one of the switches, current or voltage on the motor phases.

6. The method of claim 1, wherein the switches are MOSFETs.

7. The method of claim 6, wherein operating or selectively operating the other switches in the first group of switches comprises directing damping current through a MOSFET channel, rather than through a body diode, of one or more of the MOSFETs.

8. The method of claim 6, wherein operating or selectively operating the other switches in the first group of switches comprises switching at least one of the MOSFETs on when the body diode is about to conduct.

9. The method of claim 6, further comprising monitoring the drain-source voltage of one or more of the MOSFETs and wherein selectively turning the other switches in the first group on and off comprises, if the drain-source voltage is negative or below a preset value, turning the MOSFET on, or otherwise turning it off.

10. A control system for an electric power assisted steering apparatus comprising a plurality of inverter bridges each connected to a multi-phase motor configured to provide power assist to steering of a vehicle, wherein each of the inverter bridges comprises two groups of switches, a first group comprising a switch connected to each respective phase of the motor on a first potential side of the inverter and a second group comprising a switch connected to each respective phase of the motor on a second potential side of the inverter, the system comprising selection means for selectively operating switches in an inverter bridge in which a failure has been detected to control the current flow within the faulty inverter bridge, and control means for controlling one or more of the other inverter bridges to provide power assistance in accordance with the method of claim 1.

11. The control system of claim 10, wherein the switches are MOSFETs.

12. An electric power assisted steering system comprising a DC voltage source, a motor having a plurality of phases, and a control system according to claim 10.

* * * * *